US012799039B2

(12) United States Patent
Magnant et al.

(10) Patent No.: US 12,799,039 B2
(45) Date of Patent: Nov. 17, 2026

(54) UNITARY CERAMIC COMPONENTS AND METHODS OF FORMING THE SAME

(71) Applicant: General Electric Company, Schenectady, NY (US)

(72) Inventors: Jerome Geoffrey Magnant, Rexford, NY (US); Jared Hogg Weaver, Clifton Park, MN (US)

(73) Assignee: General Electric Company, Evendale, OH (US)

( * ) Notice: Subject to any disclaimer, the term of this patent is extended or adjusted under 35 U.S.C. 154(b) by 799 days.

(21) Appl. No.: 18/170,107

(22) Filed: Feb. 16, 2023

(65) Prior Publication Data

US 2024/0279125 A1 Aug. 22, 2024

(51) Int. Cl.
*C04B 37/00* (2006.01)

(52) U.S. Cl.
CPC .......... *C04B 37/003* (2013.01); *C04B 37/001* (2013.01); *C04B 2237/58* (2013.01)

(58) Field of Classification Search
None
See application file for complete search history.

(56) References Cited

U.S. PATENT DOCUMENTS

| | | | |
|---|---|---|---|
| 4,762,269 | A | 8/1988 | Gyarmati et al. |
| 5,975,407 | A | 11/1999 | Grasse et al. |
| 6,106,960 | A | 8/2000 | Fujii et al. |
| 6,503,441 | B2 | 1/2003 | Corman et al. |
| 7,318,547 | B2 | 1/2008 | Gasse |
| 8,939,728 | B2 | 1/2015 | McCaffrey et al. |
| 9,132,619 | B2 | 9/2015 | Khalifa et al. |
| 9,573,852 | B2 | 2/2017 | Revel et al. |
| 9,624,786 | B2 | 4/2017 | Xu et al. |
| 10,093,586 | B2 | 10/2018 | Luthra et al. |
| 10,370,301 | B2 | 8/2019 | Chamberlain et al. |
| 10,723,660 | B2 | 7/2020 | Kirby |
| 10,822,281 | B2 | 11/2020 | She et al. |
| 10,834,790 | B2 | 11/2020 | Harris |
| 10,947,162 | B2 | 3/2021 | Nelson et al. |
| 11,027,351 | B2 | 6/2021 | Landwehr et al. |

(Continued)

FOREIGN PATENT DOCUMENTS

DE 4334438 A1 4/1995

OTHER PUBLICATIONS

Ferraris et al., Glass Ceramic Coating and Joining of SiC/SiC for Fusion Applications, Journal of Nuclear Materials, ISSN 0022-3115, vol. 258-263 (pt.B), 1998, pp. 1546-1550. Abstract Only https://inis.iaea.org/search/search.aspx?orig_q=RN:30007648.

(Continued)

*Primary Examiner* — David Sample
(74) *Attorney, Agent, or Firm* — Dority & Manning, P.A.

(57) ABSTRACT

A unitary ceramic component is provided that includes a first ceramic component; a second ceramic component; and a series-hybrid joint coupling the first ceramic component to the second ceramic component. The series-hybrid joint includes a first bonding interface coupling the first ceramic component and the second ceramic component and a second bonding interface coupling the first ceramic component and the second ceramic component. The first bonding interface exhibits properties that are different from the second bonding interface.

15 Claims, 4 Drawing Sheets

(56) References Cited

U.S. PATENT DOCUMENTS

| | | | |
|---|---|---|---|
| 2008/0190552 | A1 | 8/2008 | Bouillon et al. |
| 2008/0226868 | A1 | 9/2008 | Pickering et al. |
| 2012/0171430 | A1 * | 7/2012 | Riedell .................. C04B 35/64 156/289 |
| 2012/0177488 | A1 | 7/2012 | Corman |
| 2013/0266363 | A1 * | 10/2013 | Khalifa ............... C04B 35/6269 403/270 |
| 2016/0229758 | A1 | 8/2016 | Kmetz et al. |
| 2016/0368827 | A1 * | 12/2016 | Landwehr ............... F23R 3/002 |
| 2017/0240475 | A1 | 8/2017 | Elliot et al. |
| 2019/0338660 | A1 | 11/2019 | Underwood et al. |
| 2020/0181029 | A1 | 6/2020 | Clerambourg et al. |
| 2020/0308066 | A1 | 10/2020 | Shiang et al. |
| 2021/0024427 | A1 | 1/2021 | Liliedahl et al. |
| 2021/0155553 | A1 | 5/2021 | Lenz |
| 2021/0262354 | A1 | 8/2021 | McCaffrey et al. |
| 2021/0276925 | A1 | 9/2021 | Shi et al. |

OTHER PUBLICATIONS

Griel, Polymer Derived Engineering Ceramics, Advanced Engineering Materials, 2000, vol. 2, Issue 6, pp. 339-348. (Abstract Only) https://doi.org/10.1002/1527-2648(200006)2:6<339::AID-ADEM339>3.0.CO;2-K.

Koyanagi et al., Irradiation Resistance of Silicon Carbide Joint at Light Water Reactor-Relevant Temperature, U.S Department of Energy, 21 Pages. https://www.osti.gov/pages/servlets/purl/1347314.

Lewinsohn et al., Silicon Carbide-Based Materials for Joining Silicon Carbide Composites for Fusion Energy Applications, Journal of Nuclear Materials, vols. 307-311, Part 2, Dec. 2002, pp. 1232-1236. Abstract Only https://www.sciencedirect.com/science/article/abs/pii/S0022311502010632.

Liu et al., Recent Advances in Joining of SiC-Based Materials (Monolithic SiC and $SiC_f$/SiC Composites): Joining Processes, Joint Strength, and Interfacial Behavior, ISSN 2226-4108, Journal of Advanced Ceramics, vol. 8, No. 1, 2019, pp. 19-38. https://doi.org/10.1007/s40145-018-0297-x.

Yoon et al., A Review on the Joining of SiC for High-Temperature Applications, Journal of the Korean Ceramic Society 2020, vol. 57, 2020, pp. 246-270. https://doi.org/10.1007/s43207-020-00021-4.

Zhang et al., Joining of $C_f$/SiC Ceramic Matrix Composites: A Review, Hindawi Advances in Materials Scient and Engineering, vol. 2018, Article ID 6176054, 16 Pages. https://doi.org/10.1155/2018/6176054.

* cited by examiner

UNITARY CERAMIC COMPONENTS AND METHODS OF FORMING THE SAME

FIELD

The present subject matter relates generally to joining ceramic components together, along with the resulting unitary ceramic components.

BACKGROUND

More commonly, ceramic components are being used in various applications, such as gas turbine engines. In particular, ceramic matrix composite (CMC) materials are more frequently being used for various high temperature applications. For example, because CMC materials can withstand relatively extreme temperatures, there is particular interest in replacing components within a combustion gas flow path of a gas turbine engine with components made from CMC materials. Plies of the CMC material may be laid up to form a preform component that may then undergo thermal and/or chemical processing to arrive at a component formed of a CMC material having a desired chemical composition.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Figure 1:
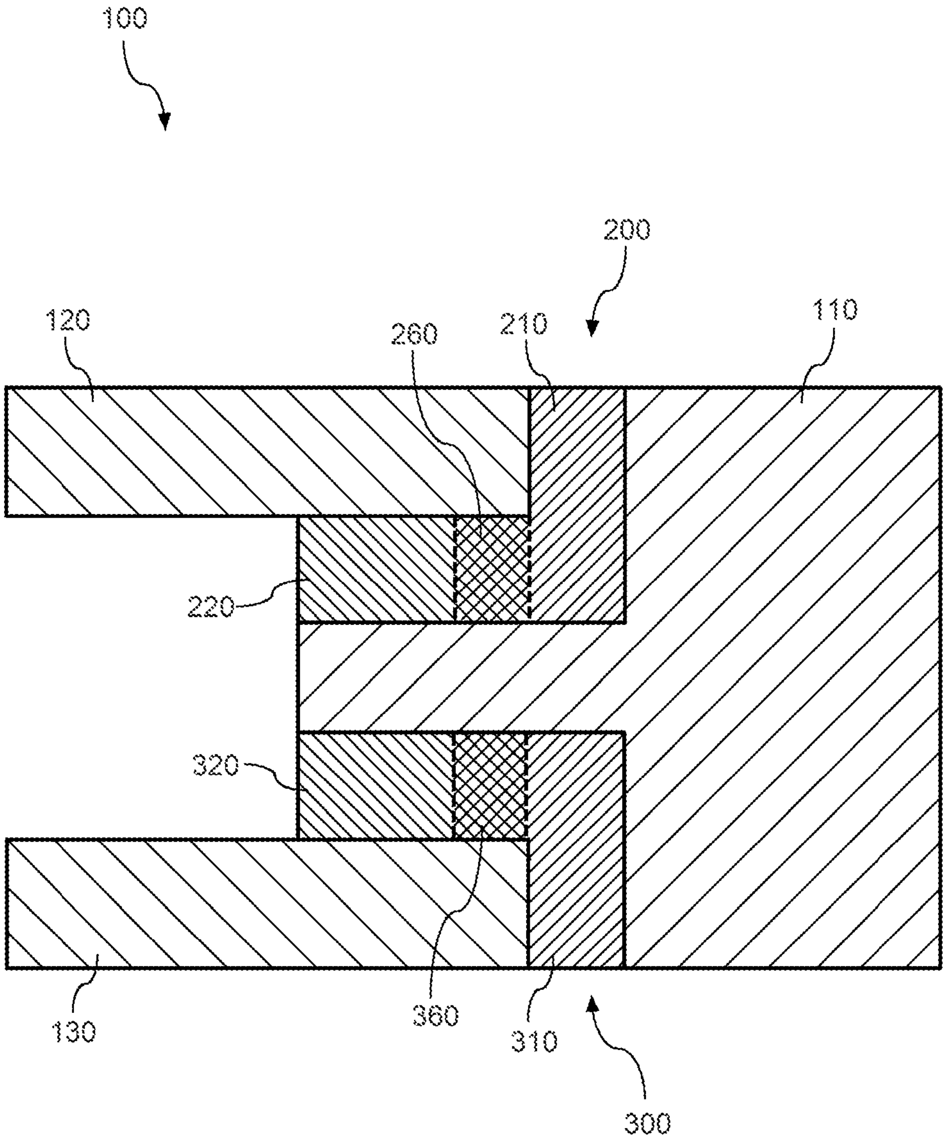
FIG. 1 shows a schematic cross-sectional view of an exemplary ceramic component containing a series-hybrid joint coupling a first ceramic component to a second ceramic component to form a unitary component.

Repeat use of reference characters in the present specification and drawings is intended to represent the same or analogous features or elements of the present disclosure.

Definitions

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random symmetries.

A "densified ceramic component" is a ceramic having less than 70 vol % porosity. Additionally, the densified ceramic component is in a finished state that will not undergo additional processing steps aimed at improving its mechanical properties. Usually, a densified ceramic component has a mechanical strength above 20 MPa, as measured by a 3 point bending test according to ASTM C1161.

As used herein, ceramic-matrix-composite or "CMC" refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/$Si_3N_4$ for silicon carbide fiber-reinforced silicon nitride; SiC/SiC—$Si_3N_4$ for silicon carbide fiber-reinforced silicon carbide/silicon nitride matrix mixture, etc. In other examples, the CMCs may include a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing and subsequent chemical processing to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

As used herein, a "melting point" refers to the temperature or range of temperature at which a solid turns to a liquid. If the melting point is a temperature range, then the melting point refers to the lowest temperature within the range at which the solid turns to a liquid.

The term "unitary" as used herein denotes that the final component has a construction in which the integrated portions are inseparable and is different from a component comprising a plurality of separate component pieces that have been joined together but remain distinct and the single component is not inseparable (i.e., the pieces may be re-separated). Thus, unitary components may comprise generally substantially continuous pieces of material or may comprise a plurality of portions that are permanently bonded to one another. In any event, the various portions forming a unitary component are integrated with one another such that the unitary component is a single piece with inseparable portions.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Large ceramic components or parts with complex geometry can be difficult to fabricate in a single piece and/or at an acceptable yield. This includes CMC components as well as other ceramic materials. As such, improved methods of fabricating ceramic components are desired. Forming smaller components and then assembling these individual smaller parts can solve this problem. However, a single joining method often cannot provide the full range of performance needed, such as mechanical strength, hermeticity, etc. As such, improved methods of fabricating ceramic components are desired.

The present disclosure is generally directed to methods for forming a unitary ceramic component by joining at least two ceramic components together (e.g., a first ceramic component to a second ceramic component, and optionally to a third ceramic component, a fourth ceramic component, etc.) utilizing at least two different types of joining methods performed sequentially to form a series-hybrid joint therebetween. The resulting unitary ceramic component has a unified construction in which the integrated portions are inseparable and permanently bonded to one another to form a continuous component. Thus, such a unitary ceramic component is different from a bonded component comprising separate component pieces that have been joined together but remain distinct with the component pieces being separable (i.e., the pieces may be re-separated). Thus, unitary components may comprise generally substantially continuous pieces of material or may comprise a plurality of portions that are permanently bonded to one another. In any event, the various portions forming a unitary ceramic component are integrated with one another such that the unitary component is a single piece with inseparable portions. Thus, the resulting unitary ceramic component may be utilized as a unitary component while being formed in a process that allows more complex shapes to be more easily formed (e.g., without complicated ply layup processes).

For instance, when joining a first ceramic component to a second ceramic component, a first joining method is performed to form a first bonding interface between the first ceramic component and the second ceramic component. Additionally, a second joining method, which is different from the first joining method, is performed to form a second bonding interface between the first ceramic component and the second ceramic component. Performing the first joining method and the second joining method results in a series-hybrid joint between the first ceramic component and the second ceramic component. As explained below, the first bonding interface formed by the first joining method and the second bonding interface formed by the second joining method may have different physical characteristics, different chemical characteristics, or both.

Since the first joining method and the second joining method are different from one another, the first bonding interface and second bonding interface may be strategically formed to include different constituents from one another, exhibit different properties from one another, or both. Alternatively, the first and second joining methods can be the same types of method but with different processing parameters thus resulting in a first bonding interface and a second bonding interface having different chemical characteristics, physical characteristics, or combinations thereof. For example, the first bonding interface and second bonding interface can be made by a first step constituted of preceramic polymer infiltration and pyrolysis and a second step constituted by chemical vapor infiltration (CVI) with different parameters used for the CVI step of the first bonding interface and the CVI steps of the second bonding interface, resulting in a first bonding interface having a different chemical composition than the second bonding interface.

For example, in one aspect, the first bonding interface may be strategically formed to exhibit relatively high strength properties, while the second bonding interface may be strategically formed to exhibit relatively high hermetic properties. In this respect, aspects of the present disclosure generally provide for the ability to form a series-hybrid joint coupling two ceramic components with specific, desired characteristics at precise locations within the series-hybrid joint. Thus, the series-hybrid joint provides a joining method that is advantageous over a single joining method that often cannot provide the full range of performance desired. That is, the series-hybrid joint may combine the advantages of each joining method (e.g., mechanical strength and hermeticity).

Referring now to the drawings, wherein identical numerals indicate the same elements throughout the figures, FIG. 1 shows a schematic cross-sectional view of an exemplary unitary ceramic component 100. The unitary ceramic component 100 includes a first ceramic component 110 and a second ceramic component 120 joined together with a series-hybrid joint 200. Generally, the series-hybrid joint 200 includes a first bonding interface 210 formed by a first joining method and a second bonding interface 220 formed by a second joining method that is different than the first joining method, where each bonding interface couples the two ceramic components 110 and 120 to form the unitary ceramic component 100.

It should be understood that various aspects of the present disclosure may be applied to any number of substrates joined together by any number of series-hybrid joints 200. Moreover, it should be understood that the series-hybrid joints 200 of the present disclosure may include any number of bonding interfaces therein. For instance, as shown in FIG. 1, the unitary ceramic component 100 may further contain a third ceramic component 130. A second series-hybrid joint 300 bonds the first ceramic component 110 and the third ceramic component 130. The second series-hybrid joint 300 may include a third bonding interface 310 and a fourth bonding interface 320. The second series-hybrid joint 300 may include joining methods that are different than those utilized to form the first series-hybrid joint 200. However, in other embodiments, the second series-hybrid joint 300 may be the same as the series-hybrid joint 200.

In one embodiment, the first ceramic component 110 contains a first ceramic matrix composite material, the second ceramic component 120 contains a second ceramic matrix composite material, and the third substrate 130 contains (if present) a third ceramic matrix composite material. In one embodiment, at least one of the first ceramic component 110, the second ceramic component 120, and the third substrate 130 may be a densified ceramic component. For example, each of the ceramic components (110, 120, 130) present in the unitary component 100 may be ceramic matrix components ("CMC") that have already been fully formed via densification via, for example, chemical vapor infiltration, melt infiltration, or preceramic polymer infiltration and pyrolysis. In certain embodiments, at least one of or all of the ceramic components (110, 120, 130) may be a ceramic component without a reinforcing material. Such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer. In some embodiments, at least one of the first ceramic component 110, the second ceramic component 120, and the third substrate 130 may be a non-densified ceramic prior to the densification of the bonding sheet and can be densified at the same time as the bonding sheet.

As stated, the first bonding interface 210 may be formed by a first joining method and the second bonding interface 220 may be formed by a second joining method, which are different from one another to allow for the series-hybrid joint 200 to have the performance advantages of both joining methods. Moreover, when present, the third bonding interface 310 may be formed by a third joining method and the fourth bonding interface 320 may be formed by a fourth joining method, which are different from one another to allow for the hybrid joint 300 to have the performance advantages of both joining methods. In this respect, because the first bonding interface 210 and second bonding interface 220 are formed by different joining methods, the first bonding interface 210 may be strategically formed to include different constituents than the second bonding interface 220, exhibit different properties from the second bonding interface 220, or both, and vice-versa. The same principle similarly applies to the third bonding interface 310, which may be strategically formed to include different constituents than the fourth bonding interface 320, exhibit different properties from the second bonding interface 220, or both, and vice-versa. The resulting constituents and properties of any particular bonding interface depends on, among other things, the joining method employed to form the respective bonding interface.

For example, the first bonding interface 210 and the second bonding interface 220 may be formed with different chemical compositions. Referring to FIG. 1, the first bonding interface 210 may contain a first constituent and the second bonding interface 220 may contain a second constituent that is different than the first constituent. Similarly, the third bonding interface 310 may contain a third constituent that is different than a fourth constituent within the fourth bonding interface 320.

The type of constituent that may be present in any particular bonding interface depends on, among other things, the joining method employed to form the respective bonding interface. For instance, performing a glass ceramic joining method to form any particular bonding interface may result in a bonding interface containing a respective constituent including a glass-ceramic material. Furthermore, performing a method of metallic braze-based joining to form any particular bonding interface may result in a bonding interface containing a respective constituent including a metallic alloy. Moreover, performing a method of preceramic polymer joining or reaction bonding to form any particular bonding interface may result in a bonding interface containing a respective constituent including a ceramic material.

As discussed, aspects of the present disclosure generally provide for the ability to form a series-hybrid joint coupling two substrates with specific, desired characteristics at precise locations within the series-hybrid joint. Thus, in one example aspect, the first bonding interface 210 may be strategically formed to impart a relatively high degree of strength to the series-hybrid joint 200, while the second bonding interface 220 may be strategically formed to impart a relatively high degree of hermeticity to the series-hybrid joint 200, and vice-versa. Moreover, in another example aspect, the third bonding interface 310 may be strategically formed to impart a relatively high degree of strength to the second series-hybrid joint 300, while the fourth bonding interface 320 may be strategically formed to impart a relatively high degree of hermeticity to the second series-hybrid joint 300, and vice-versa.

For instance, at least one of the first bonding interface 210, the second bonding interface 220, the third bonding interface 310, and the fourth bonding interface 320 may exhibit a strength of 25 MPa or more, such as 40 MPa or more, such as 50 MPa or more, such as 70 MPa or more, such as 90 MPa or more, such as 100 MPa when subject to a four point bending test.

In another example aspect, at least one of the first bonding interface 210, the second bonding interface 220, the third bonding interface 310, and the fourth bonding interface 320 may exhibit a shear strength of 50 MPa or more, such as 60 MPa or more, such as 70 MPa or more, such as 80 MPa or more, such as 90 MPa or more, such as 100 MPa.

In yet another embodiment, at least one of the first bonding interface 210, the second bonding interface 220, the third bonding interface 310, and the fourth bonding interface 320 may exhibit a tensile strength of 50 MPa or more, such as 70 MPa or more, such as 90 MPa or more, such as 120 MPa or more, such as 160 MPa or more, such as 200 MPa.

In the embodiment of FIG. 1, the first bonding interface 210 and the second bonding interface 220 form a gradient zone 260 therebetween. In this gradient zone 260, the characteristics (e.g., constituents) of the first bonding interface 210 and the second bonding interface 220 may be mixed. For example, a gradient zone 260 may transition in composition from a first material in the first bonding interface 210 to a second material in the second bonding interface 220. For instance, the gradient zone 260 may include a graded transition from the first bonding interface 210 and the second bonding interface 220 that is stepped such that the change is non-linear. Alternatively, the gradient zone 260 may include a continuous transition from the first bonding interface 210 and the second bonding interface 220 such that the characteristics (e.g., constituents) constantly change from the first bonding interface 210 and the second bonding interface 220.

Such a gradient zone 260 may be formed when performing any particular joining method results in a bonding interface that overlaps with at least a portion of another bonding interface. In certain embodiments, the gradient zone 260 may be formed via diffusion or chemical reaction between materials of the adjacent bonding interfaces 210, 220. Similarly, the second series-hybrid joint 300 may further include a second gradient zone 360 that couples the third bonding interface 310 to the fourth bonding interface 320. Alternatively, as shown in the embodiment of FIG. 3, the first bonding interface 210 is adjacent to the second bonding interface 220 with a sharp interface 265 therebetween that is substantially free of any gradient.

As shown in FIG. 1, the first series-hybrid joint 200 and the second series-hybrid joint 300 are represented in a two-dimensional perspective having an "L-shape". However, the shapes of the first series-hybrid joint 200 and the second series-hybrid joint 300 from both a two-dimensional and three-dimensional perspective, are not limited, as their shapes generally depends on the shape of the substrates being joined, particularly at their respective surface that is being joined. In this respect, the overall shape, length, and width of the series-hybrid joint 200 and the second series-hybrid joint 300 is similarly not limited, as it depends largely, among other things, on the intended used of the unitary ceramic component 100.

Figure 2:
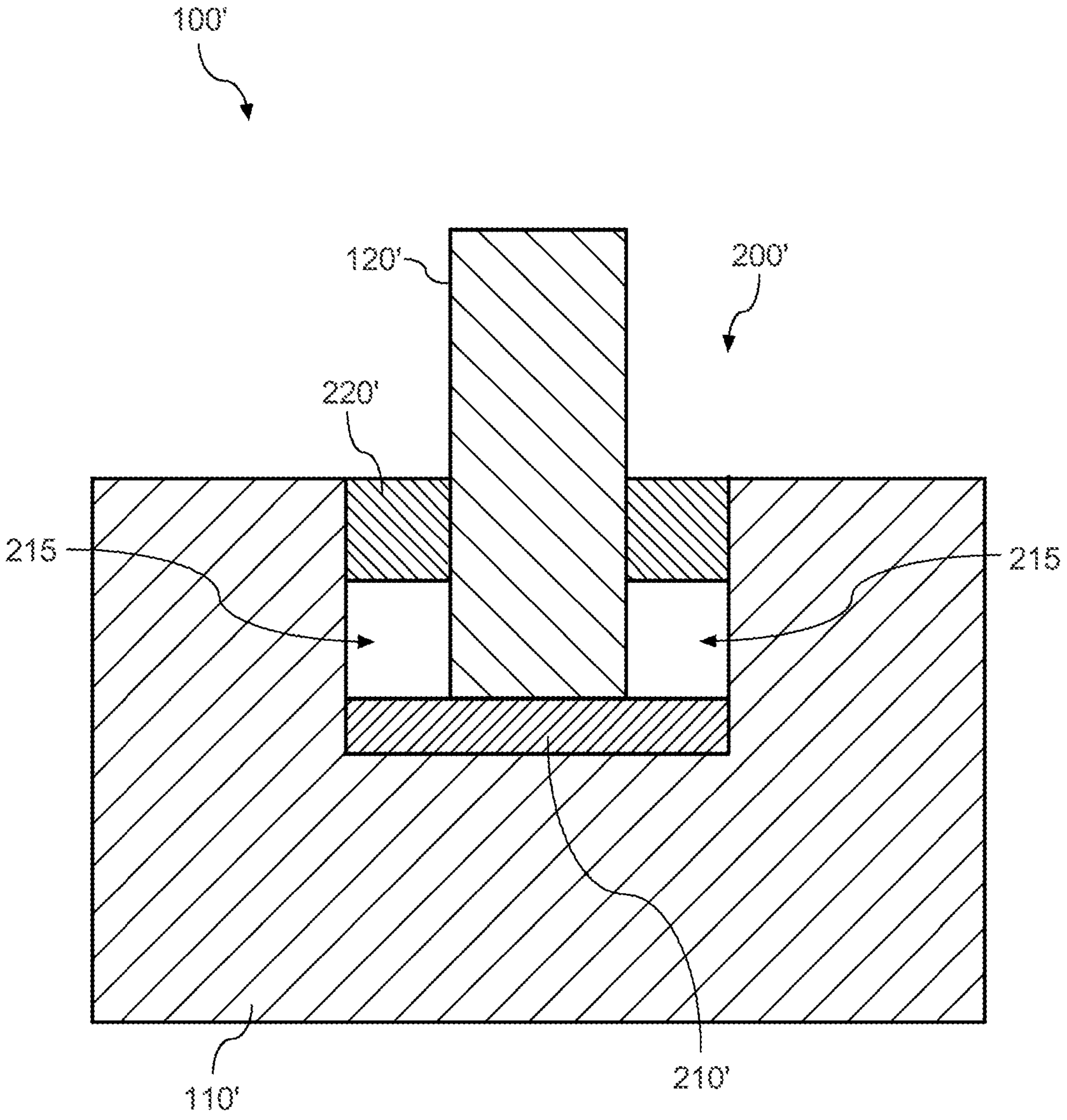
FIG. 2 shows a schematic cross-sectional view of another exemplary ceramic component containing a series-hybrid joint coupling a first ceramic component to a second ceramic component to form a unitary component.

Referring to FIG. 2, another exemplary unitary ceramic component 100' is generally shown with a first ceramic component 110' and a second ceramic component 120' joined together with a series-hybrid joint 200', similar to that discussed above with respect to the embodiment shown in FIG. 1. In FIG. 2, the series-hybrid joint 200' is formed from a first bonding interface 210' formed by a first joining method and a second bonding interface 220' formed by a second joining method that is different than the first joining method. In the embodiment of FIG. 2, the first bonding interface 210' and the second bonding interface 220' are not in contact with each other, defining a gap 215 therebetween. In the embodiment of FIG. 2, the gap 215 may be hollow so as to be substantially free from any solid material.

Figure 3:
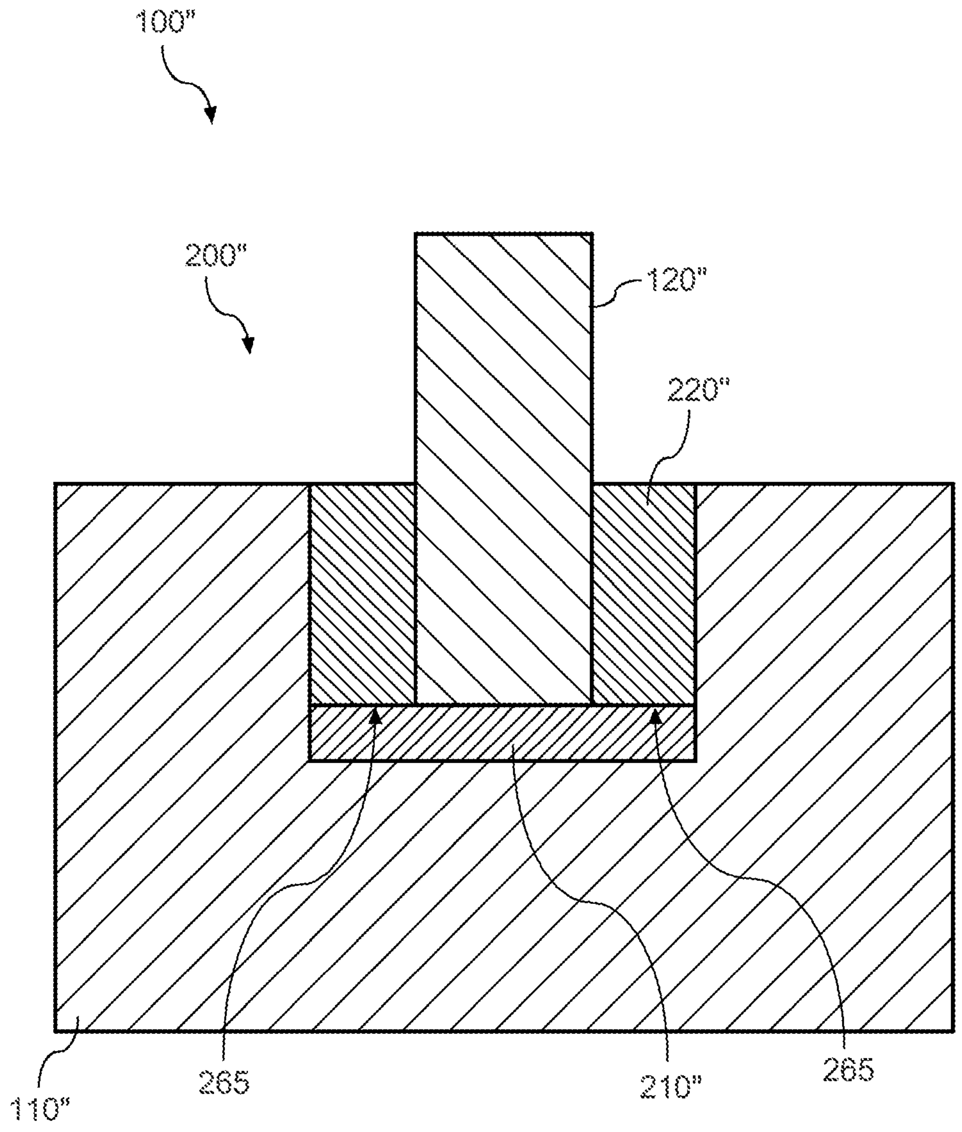
FIG. 3 shows a schematic cross-sectional view of another exemplary ceramic component containing a series-hybrid joint coupling a first ceramic component to a second ceramic component to form a unitary component.

Referring to FIG. 3, another exemplary unitary ceramic component 100" is generally shown with a first ceramic component 110" and a second ceramic component 120" joined together with a series-hybrid joint 200", similar to that discussed above with respect to the embodiment shown in FIG. 1. In FIG. 3, the series-hybrid joint 200" is formed from a first bonding interface 210" formed by a first joining method and a second bonding interface 220" formed by a second joining method that is different than the first joining method. In the embodiment of FIG. 3, the first bonding interface 210' and the second bonding interface 220' are in contact with each other at the sharp interface 265 therebetween.

As used herein, the "orientation" of a bonding interface generally refers to the relative physical position of the bonding interface with respect to the other bonding interface within the respective series-hybrid joint. For example, as shown in FIG. 1, the first bonding interface 210 may have a first orientation and the second bonding interface 220 may have a second orientation that is different from the first orientation. In FIG. 1, the third bonding interface 310 may have a third orientation and the fourth bonding interface 320 may have a fourth orientation that is different from the third orientation. However, the orientation that may be employed for any particular bonding interface is virtually not limited, as each bonding interface may be formed having any desirable orientation that would satisfy the unitary ceramic components intended use.

Figure 4:
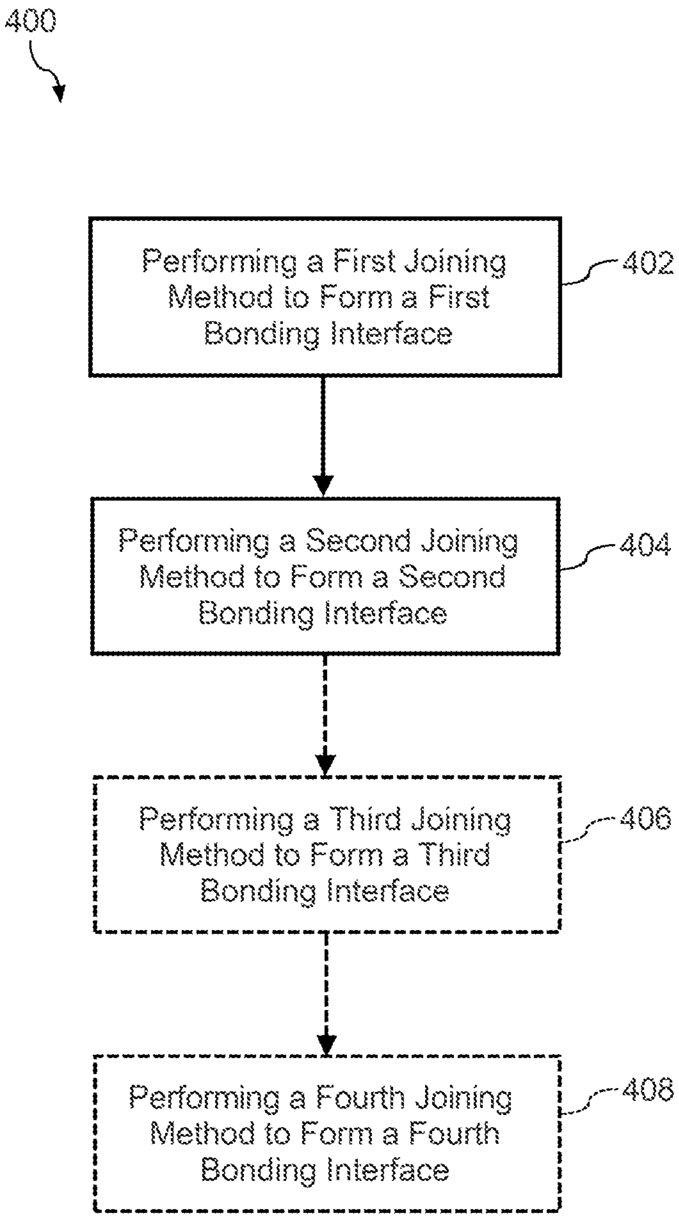
FIG. 4 shows a flow chart diagram of an exemplary method of forming a unitary ceramic component.

Referring now to FIG. 4, a flow chart diagram of an exemplary method 400 of forming a ceramic component is provided. The method may include, at 402, performing a first joining method to form a first bonding interface between a first ceramic component and a second ceramic component. The method may further include, at 404, performing a second joining method to form a second bonding interface between the first ceramic component and the second ceramic component. The first joining method and the second joining method form a series-hybrid joint comprising the first bonding interface and the second bonding interface that couples the first ceramic component to the second ceramic component. As described above, the first joining method is different from the second joining method. Thus, the first bonding interface and second bonding interface may be strategically formed to include different constituents from one another, exhibit different properties from one another, or both. Optionally, the method may further include, at 406, performing a third joining method to form a third bonding interface between the first ceramic component and the second ceramic component. As described above, the third joining method is different from the first joining method and the second joining method. Optionally, the method may further include, at 408, performing a fourth joining method to form a fourth bonding interface between the first ceramic component and the second ceramic component. As described above, the fourth joining method is different from the first joining method, the second joining method, and the third joining method.

Any suitable joining methods that can be utilized as the first joining method and the second joining method (and the optional third joining method and the optional fourth joining method) can be independently selected. For example, the joining methods may be brazing, reaction bonding, preceramic polymer infiltration and pyrolysis, chemical vapor infiltration, glass ceramic joining, solid state diffusion bonding, etc. Thus, the joining of ceramic components together can be done by a variety of combinations, including at least two of any of such methods or any methods discussed herein.

In a brazing process, the ceramic components are positioned in contact together and a braze alloy is melted and allowed to infiltrate into the bonding interface. In some cases, one or multiples filler materials can be positioned in a bonding interface between the ceramic components to start filling spaces in the bonding interface before the densification happens during melting the metal alloy that will infiltrate the space defined between the fillers materials and consolidate plus densify the bonding interface. For example, the filler material can be introduced into the bonding interface by a preceramic polymer (e.g., a polycarbosilane). Thermal conversion steps may then be performed to form silicon carbide-based ceramic particles/fillers in the bonding interface. Then, the bonding interface is densified by brazing with a braze metal (e.g., a silicon alloy, a titanium alloy, etc.) that melts and infiltrates the spaces between the particles/fillers.

In a reaction bonding process, also called reactive brazing process, a reactive constituent is positioned in the bonding interface (e.g., in the form of fillers) so as to react with the braze alloy to form a new compound. For example, particles of carbon and/or silicon carbide can be introduced in the bonding interface (e.g., via a paste or slurry) in order to start filling spaces in the bonding interface and provide some materials that can react with a molten silicon braze alloy to form silicon carbide during the heat treatment of brazing. Another example of reaction bonding is the chemical reaction between titanium carbide particles located in the joint area, and molten silicon, to form the ceramic MAX phase $Ti_3SiC_2$.

In a preceramic polymer infiltration and pyrolysis process, the bonding interface is formed by providing at least a preceramic polymer in the bonding interface and converting it by pyrolysis into a ceramic. Since the yield conversion from the preceramic polymer to the ceramic is not 100%, the bonding interface is still porous after a single polymer deposition/infiltration step and pyrolysis. To provide a bonding interface with desired characteristics (e.g., desired mechanical properties), infiltration and pyrolysis can be repeated a few times to help densify and consolidate the bonding interface. To help consolidate the bonding interface and build up some volume in the bonding interface, some fillers/inclusions (e.g., in the form of powder or fibers) may be brought in the bonding interface before the impregnation by the preceramic polymer or during the impregnation by the preceramic polymer itself. For example, silicon carbide particles may be deposited in the bonding interface in the form of a slurry/paste, then heated to dry the suspensive media from the slurry/paste, then infiltrated by a preceramic polymer, and finally pyrolyzed. The sequences and variations can be repeated to provide desired material in the bonding interface to give the bonding interface its desired properties, like mechanical properties. In another example, the preceramic polymer and the solid particles are mixed together, and then deposited in the bonding interface before the conversion of the preceramic polymer to a ceramic by pyrolysis.

In a chemical vapor infiltration (CVI) joining method, the two ceramic components are positioned in contact together and the bonding interface formed/densified/sealed by chemical vapor infiltration. A scaffold may be provided in the bonding interface (e.g., in the form of fillers/inclusions materials) between which the gas from the CVI process will diffuse through and react onto to form a solid. Example of fillers/inclusions materials for the scaffold include, but are not limited to, inorganic powders (e.g., ceramic particles such as silicon carbide, TiC, $TiB_2$, $B_4C$, $Al_2O_3$, $ZrO_2$, and mixtures thereof), metal particles (e.g., Ti, Zr, Co, and alloys thereof), fibers or whiskers (e.g., ceramic fibers such as silicon carbide, TiC, $TiB_2$, $B_4C$, $Al_2O_3$, $ZrO_2$, etc., and mixtures thereof, carbon fibers, etc.), preceramic polymers configured to be converted into a ceramic by a thermal treatment of pyrolysis (e.g., silicon carbide) formed by the thermal treatment of a polycarbosilane preceramic polymer, a mix of inorganic powders and preceramic polymer or resin, etc. To provide enough inclusions into the bonding interface, the impregnation by the preceramic polymer and its conversion by pyrolysis can be repeated multiple times.

In a glass ceramic joining process, the bonding interface is formed by the introduction of glass particles in the bonding interface and then melting to form a solid glass phase, which is then transformed into a glass-ceramic material by a thermal treatment of devitrification of the glass. Some fillers materials (e.g., inorganic particles) can also be positioned in the bonding interface before the deposition of the glass particles or concomitant to the deposition of the glass particles. Those inorganic particles can help tailor the properties of the bonding interface.

In a transient eutectic-phase joining process, often referred to as liquid-phase sintering for ceramic processing, a liquid eutectic phase forms during joining, but then later disappears via chemical reaction. Usually, this technique utilizes dissolution-reprecipitation processes of silicide ceramic with a silica-alumina-rare earth oxide eutectics to obtain a dense body. An example of this composition is a mixture of silicon carbide powder with alumina and yttria additives.

However, as discussed above, it is not always possible to obtain all the desired bonding interface properties by a single joining method whose temperature is compatible with the thermal stability of the materials to join. The use of a second joining method to form the second bonding interface with other properties supplements the properties or characteristics from the first bonding interface.

Thus, the present disclosure may form an assembly by advantageously combining two or more joining methods. For example, a first joining method can be used to provide the mechanical strength and a second joining method can be used to provide the chemical resistance to the environment of the bonding interface. In such an embodiment, for example, the first bonding interface may be formed by reaction bonding and the second bonding interface may be formed by chemical vapor infiltration. For instance, the utilization of silicon reaction bonding as a first joining method may provide the thermomechanical strength, and a silicon carbide chemical vapor infiltration method may provide the chemical inertness with respect to water in a nuclear water based environment. Another example is a first joining method made by preceramic polymer infiltration and pyrolysis to form the first bonding interface and a second joining method made by glass ceramic in order to provide gas hermeticity to form the second bonding interface.

In one embodiment, at least one of performing the first joining method performing the second joining method, and optionally performing any additional joining methods (e.g., third joining method, fourth joining method, etc.) may include a combination of performing a method of glass-ceramic joining, metallic braze-based joining, preceramic polymer joining (also known as polymer-derived ceramic joining), reaction bonding (like Si—C reaction bonding), solid state diffusion bonding, transient eutectic-phase joining, MAX-phase joining, chemical vapor deposition (CVD), chemical vapor infiltration (CVI), selective area CVD, selective area CVI, or particles filler introduction.

In another embodiment, a bonding interface between two silicon carbide (SiC) components made by solid state diffusion bonding of a titanium foil has very good mechanical properties, but the bonding interface is microcracked due to coefficient of thermal expansion mismatch between the bonding interface compounds and the components joined. Those microcracks may results in a lack of gas hermeticity, which can be detrimental in a lot of applications.

For example, a bonding interface made by glass ceramic joining can provide the desired mechanical properties and hermeticity in respect to gas or fluid cooling but not be chemically compatible with the working environment. Methods of glass-ceramic joining generally involve applying a glass material to the substrates that are desired to be coupled by the resulting bonding interface and, thereafter, heat-treating the glass material to melt and devitrified the glass-ceramic material such that it is partially or completely recrystallized to form a glass-ceramic bonding interface. Examples of suitable glass-ceramic material that may be employed in the present disclosure include, but are not limited to, yttrium aluminum garnet ($Y_3Al_5O_{12}$), yttrium monosilicate ($Y_2SiO_5$), yttrium disilicate ($Y_2SiO_7$), mullite ($3Al_2O_3 \cdot 2SiO_2$ or $2Al_2O_3 \cdot SiO_2$), CaO—$Al_2O_3$, and various compositions of Y—Al—Si—O—(C) systems.

Particularly, forming the first bonding interface using a method of glass-ceramic joining may result in the first bonding interface exhibiting relatively high strength properties, while forming the second bonding interface using a method of chemical vapor infiltration/chemical vapor deposition may result in the second bonding interface exhibiting good corrosion resistance in working environments.

In certain embodiments, a bonding interface made by reaction bonding may contain free silicon from the brazing alloy that impede its utilization in a nuclear water environment. Methods of metallic braze-based joining exploit the adhesion and diffusion of a metallic alloy, which may couple the substrates it is applied to upon the melting of the metallic alloy in the metallic alloy layer. Methods of metallic braze-based joining include applying a metallic alloy layer to the substrates that are desired to be coupled by the resulting bonding interface and treating the metallic alloy layer, transforming into a bonding interface. Alternatively, the metallic alloy is applied adjacent to the bonding interface and during a heat treatment to melt the alloy; the alloy in molten form infiltrates the bonding interface to form a metallic alloy layer between the 2 ceramic components. Metallic alloys employed may include noble metals, reactive metals, or a combination thereof. Noble metals may maintain their initial metallic form both during and after joining, while reactive metals may form intermetallic compounds or ceramic compounds within the bonding interface by reacting with carbon or any other inorganic species during brazing that is thus called reactive brazing. Suitable noble metals for use in the present disclosure may include, but are not limited to, Ag, Pt, Cu, Ni, or combinations thereof. Suitable reactive metals for use in the present disclosure may include, but are not limited to, Ti, Al, Si, Zr, or combinations thereof.

The treatment of the metallic alloy layer in metallic braze-based joining methods generally involve heating the metallic alloy layer to a treatment temperature at atmospheric pressure. Treatment temperatures may vary from 1,000° C. to 1,500° C., such as from 1,250° C. to 1,500° C., such as from 1,400° C. to 1,500° C. Upon treatment, the metallic alloy layer is transformed into a bonding interface, which couples the respective substrates.

In another example aspect, at least one of performing the first joining method, performing the second joining method, performing the third joining method, and performing the fourth joining method may include performing a method of preceramic polymer joining. Methods of preceramic polymer joining generally involve applying an organosilicon polymer layer containing one or more organosilicon polymers, such as poly(carbosilanes), poly(silazanes), and poly (siloxanes), which transforms into SiC via a pyrolytic decomposition process during treatment. The organosilicon polymers employed in preceramic joining methods are generally not limited. For instance, in one example aspect, chloro-organosilicon compounds are used as starting materials for the production of poly(silanes), poly(carbosilanes), poly(silazanes), poly(siloxanes), or combinations thereof, which are converted to Si-containing ceramic by a dichlorination process combined with a cross-linking process.

The treatment of the organosilicon polymer layer in preceramic polymer joining methods generally involve multiple steps: heating the organosilicon polymer layer to a temperature of 550° C. to 800° C. to initiate an organic to inorganic transition; further heating the organosilicon polymer layer to a temperature of 1200° C. to 1600° C. to initiate nucleation of crystals; and further heating the organosilicon polymer layer 1600° C. to initiate grain coarsening. Because the preceramic polymers undergo a large density and mass change when converting to a ceramic a large amount of porosity is developed. This porosity is usually densified, either by multiple precursor impregnation and pyrolysis cycles or via another infiltration method such as chemical vapor infiltration or melt infiltration. Upon treatment, the organosilicon polymer layer is transformed into a bonding interface, which couples the respective substrates.

In general, methods of reaction bonding involve applying at least one material in the zone of the contact area to the substrates desired to be coupled that will further react during a thermal treatment between themselves or with a metal or metal alloy that is infiltrated in the bond area. An example of reaction bonding may involve a carbon containing layer to a zone of the contact area to the substrates desired to be coupled. Thereafter, a melt infiltration technique is performed to introduce molten metal like Si, Ti, or Zr into the carbon containing layer, which reacts with its contents to form, respectively, SiC, TiC, or ZrC.

Upon treatment, the carbon containing layer is transformed into a bonding interface, which couples the respective substrates. In other examples a boron containing layer is placed to a zone of the contact area to the substrates desired to be coupled. Thereafter, a melt infiltration technique is performed to introduce molten metal like Si, Ti or Zr into the carbon containing layer, which reacts with its contents to form $SiB_3$, $TiB_2$, $ZrB_2$, respectively.

In one embodiment the treatment temperature to form a silicon carbide reaction bonded joint by reaction bonding of a silicon alloy with carbon materials involves a brazing temperature of 1300° C. to 1500° C., such as 1350° C. to 1450° C. (e.g., 1380° C. to 1440° C.).

As discussed, during a method of preceramic polymer joining, an organosilicon polymer layer is transformed into SiC via a pyrolytic decomposition process during treatment. However, the resulting bonding interface formed via preceramic joining contains a SiC matrix, which generally exhibits a relatively high degree of porosity, which may lead to the bonding interface exhibiting relatively poor strength and hermetic properties. Thus, the strength and hermeticity of the resulting bonding interface may be improved by, thereafter, performing a densification method to "densify" the bonding interface.

For example, in one example aspect, performing the densification method may include performing a method of melt infiltration or a method of chemical vapor infiltration. Densification methods may be employed as a supplement to particular joining methods as described herein, which may increase the strength and hermeticity and/or corrosion and/or chemical resistance of the resulting bonding interface.

Specific processing techniques used and parameters for densification can depend on the particular composition of the materials and are generally known in the art. For instance, in one example aspect, performing the densification method may include performing a method of chemical vapor infiltration, in which a matrix material is infiltrated by the reactive gases at elevated temperatures to densify the bonding interface.

Accordingly, as described herein, the present subject matter provides for improved bonding interfaces (i.e., series-hybrid joints) between ceramic components and methods of forming the same. For instance, the current state of the art generally employs a single joining method to form a single bonding interface in between two smaller ceramic substrates. However, trade-offs exist between each individual joining method, and a single bonding interface formed by a single joining method generally exhibits some properties that are required by the resulting component's particular intended use, but not all. Conversely, the series-hybrid joints and methods described herein provide for a series-hybrid joint which couples two substrates, in which the series-hybrid joint exhibits specific, desired characteristics at precise locations within the series-hybrid joint.

Moreover, the present subject matter provides for an improved method of forming relatively large ceramic components. For instance, large ceramic components including coupled ceramic substrates and ceramic components with complex geometries may be difficult to form at acceptable yields. Conversely, the series-hybrid joints and methods described herein provide for the ability to couple smaller ceramic substrates having simple geometries, which may be formed at improved yields.

The unitary ceramic components described herein are particularly suitable for use as a component found in high temperature environments, such as those present in gas turbine engines, for example, combustor components, turbine blades, shrouds, nozzles, heat shields, and vanes. In particular, the unitary ceramic component described herein may be a component positioned within a hot gas flow path of the gas turbine. The term "gas turbine engine" refers to an engine having a turbomachine as all or a portion of its power source. The term "turbomachine" or "turbomachinery" refers to a machine including one or more compressors, a heat generating section (e.g., a combustion section), and one or more turbines that together generate a torque output. Example gas turbine engines include turbofan engines, turboprop engines, turbojet engines, turboshaft engines, etc., as well as hybrid-electric versions of one or more of these engines.

Further aspects of the disclosure are provided by the subject matter of the following clauses:

A unitary ceramic component, comprising: a first ceramic component; a second ceramic component; and a series-hybrid joint coupling the first ceramic component to the second ceramic component, wherein the series-hybrid joint comprises a first bonding interface coupling the first ceramic component and the second ceramic component, and a second bonding interface coupling the first ceramic component and the second ceramic component, wherein the first bonding interface exhibits properties that are different from the second bonding interface.

The unitary ceramic component of any preceding claim, wherein the first bonding interface has a strength that is greater than the second bonding interface.

The unitary ceramic component of any preceding claim, wherein the second bonding interface has a hermeticity that is greater than the first bonding interface.

The unitary ceramic component of any preceding claim, wherein the second bonding interface has a chemical resistance that is greater than the first bonding interface.

The unitary ceramic component of any preceding claim, wherein the first bonding interface is a brazed interface, a reactive brazed interface, a preceramic polymer infiltrated and pyrolysis interface, a chemical vapor infiltrated interface, a glass ceramic joined interface, or a solid state diffusion bonded interface.

The unitary ceramic component of any preceding claim, wherein the second bonding interface is a brazed interface, a reactive brazed interface, a preceramic polymer infiltrated and pyrolysis interface, a chemical vapor infiltrated interface, a glass ceramic joined interface, or a solid state diffusion bonded interface.

The unitary ceramic component of any preceding claim, wherein the first bonding interface has a first orientation and the second bonding interface has a second orientation, wherein the first orientation and the second orientation are different.

The unitary ceramic component of any preceding claim, wherein the joint further comprises a gradient zone coupling the first bonding interface to the second bonding interface.

The unitary ceramic component of any preceding claim, wherein the graded zone is a graded transition such that the change from the first bonding interface and the second bonding interface is stepped.

The unitary ceramic component of any preceding claim, wherein the graded zone is a continuous transition from the first bonding interface and the second bonding interface.

The unitary ceramic component of any preceding claim, wherein the first bonding interface is adjacent to the second bonding interface, and wherein the series-hybrid joint further comprises a sharp interface between the first bonding interface and the second bonding interface.

The unitary ceramic component of any preceding claim, wherein the first bonding interface is spaced apart from the second bonding interface.

The unitary ceramic component of any preceding claim, wherein a gap is defined between the first bonding interface and the second bonding interface.

The unitary ceramic component of any preceding claim, wherein the first bonding interface comprises at least one of a glass-ceramic material, a metallic alloy, an intermetallic, a ceramic, or a ceramic matrix composite material, or a metal matrix composite.

The unitary ceramic component of any preceding claim, wherein the second bonding interface comprises at least one of a glass-ceramic material, a metallic alloy, an intermetallic, a ceramic, or a ceramic matrix composite material, or a metal matrix composite.

The unitary ceramic component of any preceding claim, further comprising: a third ceramic component; and a second series-hybrid joint coupling the first ceramic component to the third ceramic component, wherein the second series-hybrid joint comprises a third bonding interface between the first ceramic component and the third ceramic component, and a fourth bonding interface between the first ceramic component and the third ceramic component, wherein the third bonding interface exhibits properties that are different from the fourth bonding interface.

The unitary ceramic component of any preceding claim, wherein the first ceramic component comprises a first densified ceramic matrix composite.

The unitary ceramic component of any preceding claim, wherein the second ceramic component comprises a densified ceramic matrix composite.

A method of forming a unitary ceramic component, the method comprising: performing a first joining method to form a first bonding interface between a first ceramic component and a second ceramic component; performing a second joining method to form a second bonding interface between the first ceramic component to the second ceramic component, wherein the first joining method is different than the second joining method.

The method of any preceding claim, wherein the first ceramic component is a first densified ceramic component prior to performing the first joining method, and wherein the second ceramic component is a second densified ceramic component prior to performing the first joining method.

The method of any preceding claim, wherein the first joining method comprises glass-ceramic joining, metallic braze-based joining, preceramic polymer joining, reaction bonding, solid state diffusion bonding, transient eutectic-phase joining, MAX-phase joining, chemical vapor deposition (CVD), chemical vapor infiltration (CVI), selective area CVD, selective area CVI, or particles filler introduction, and wherein the second joining method comprises glass-ceramic joining, metallic braze-based joining, preceramic polymer joining, reaction bonding, solid state diffusion bonding, transient eutectic-phase joining, MAX-phase joining, chemical vapor deposition (CVD), chemical vapor infiltration (CVI), selective area CVD, selective area CVI, or particles filler introduction.

The method of any preceding claim, wherein the second bonding interface is formed adjacent to the first bonding interface such that a gradient zone is formed coupling the first bonding interface to the second bonding interface.

The method of any preceding claim, wherein the second bonding interface is formed adjacent to the first bonding interface such that a sharp interface with no gradient zone is formed coupling the first bonding interface to the second bonding interface.

The method of any preceding claim, wherein the second bonding interface is formed such that a space is defined between the first bonding interface and the second bonding interface.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A unitary ceramic component, comprising:

a first ceramic component;

a second ceramic component; and a series-hybrid joint coupling the first ceramic component to the second ceramic component, wherein the series-hybrid joint comprises a first bonding interface disposed between a first surface of the first ceramic component and a first surface of the second ceramic component, the first bonding interface coupling the first ceramic component and the second ceramic component, and a second bonding interface disposed between a second surface of the first ceramic component and a second surface of the second ceramic component, the second bonding interface further coupling the first ceramic component and the second ceramic component, wherein the series-hybrid joint further comprises a gradient zone comprising an overlap of at least a portion of the first bonding interface with at least a portion of the second bonding interface, wherein the first bonding interface exhibits properties that are different from the second bonding interface, wherein the first bonding interface has a first orientation and the second bonding interface has a second orientation, wherein the first orientation and the second orientation are different.

2. The unitary ceramic component of claim 1, wherein the first bonding interface has a strength that is greater than the second bonding interface.

3. The unitary ceramic component of claim 2, wherein the second bonding interface has a hermeticity that is greater than the first bonding interface.

4. The unitary ceramic component of claim 2, wherein the second bonding interface has a chemical resistance that is greater than the first bonding interface.

5. The unitary ceramic component of claim 1, wherein the first bonding interface is a brazed interface, a reactive brazed interface, a preceramic polymer infiltrated and pyrolysis interface, a chemical vapor infiltrated interface, a glass ceramic joined interface, a transient eutectic phase joining, or a solid state diffusion bonded interface.

6. The unitary ceramic component of claim 5, wherein the second bonding interface is a brazed interface, a reactive brazed interface, a preceramic polymer infiltrated and pyrolysis interface, a chemical vapor infiltrated interface, a glass ceramic joined interface, a transient eutectic phase joining, or a solid state diffusion bonded interface.

7. The unitary ceramic component of claim 1, wherein the gradient zone is a graded transition such that a change from the first bonding interface and the second bonding interface is stepped.

8. The unitary ceramic component of claim 1, wherein the gradient zone is a continuous transition from the first bonding interface and the second bonding interface.

9. The unitary ceramic component of claim 1, wherein the first bonding interface comprises at least one of a glass-ceramic material, a metallic alloy, an intermetallic, a ceramic, or a ceramic matrix composite material, or a metal matrix composite material.

10. The unitary ceramic component of claim 1, wherein the second bonding interface comprises at least one of a glass-ceramic material, a metallic alloy, an intermetallic, a ceramic, or a ceramic matrix composite material, or a metal matrix composite material.

11. The unitary ceramic component of claim 1, further comprising:

a third ceramic component; and a second series-hybrid joint coupling the first ceramic component to the third ceramic component, wherein the second series-hybrid joint comprises a third bonding interface between the first ceramic component and the third ceramic component, and a fourth bonding interface between the first ceramic component and the third ceramic component, wherein the third bonding interface exhibits properties that are different from the fourth bonding interface.

12. The unitary ceramic component of claim 1, wherein the first ceramic component comprises a first densified ceramic matrix composite.

13. The unitary ceramic component of claim 12, wherein the second ceramic component comprises a densified ceramic matrix composite.

14. A method of forming a unitary ceramic component, the method comprising:

performing a first joining method to form a first bonding interface at a first orientation between a first surface of a first ceramic component and a first surface of a second ceramic component; and performing a second joining method to form a second bonding interface at a second orientation between a second surface of the first ceramic component and a second surface of the second ceramic component, wherein the first orientation and the second orientation are different, wherein the first joining method is different than the second joining method, and wherein performing at least one of the first joining method or the second joining method forms a gradient zone comprising an overlap of at least a portion of the first bonding interface with at least a portion of the second bonding interface.

15. The method of claim 14, wherein the first ceramic component is a first densified ceramic component prior to performing the first joining method, and wherein the second ceramic component is a second densified ceramic component prior to performing the first joining method.

* * * * *